UNITED STATES PATENT OFFICE.

CLIFFORD RICHARDSON, OF NEW YORK, N. Y.

PROCESS OF MANUFACTURING AN IMPROVED BITUMINOUS SUBSTANCE.

1,198,769.      Specification of Letters Patent.     Patented Sept. 19, 1916.

No Drawing.     Application filed August 24, 1914. Serial No. 858,335.

*To all whom it may concern:*

Be it known that I, CLIFFORD RICHARDSON, residing at New York city, in the county of New York and State of New York, have invented a certain new and useful Process of Manufacturing an Improved Bituminous Substance, whereof the following is a specification.

My invention relates to a process whereby I impart to bituminous substances a higher degree of body or stability.

It has heretofore been well known that the addition of finely divided mineral matter to bituminous substances increases their body and this has been availed of in the paving and other arts. Thus, in the making of a bituminous paving mixture, it has been customary to add to the bitumen, in addition to the coarser mineral aggregate, a certain proportion of impalpable powder and the utility of this addition has been recognized.

According to my invention, I obtain in liquid or semi-liquid or semi-solid bituminous substances an increased or greater degree of body and stability over and above that of the material as ordinarily prepared (meaning thereby a greater resistance to deformation under pressure), by means of the addition, in the manner hereafter specified of solid matter in a highly dispersed colloidal state. I attribute this result in part at least, to the enormous surface area which matter in a highly dispersed colloidal state presents per volume of weight, and consequently the enormous amount of surface energy developed.

In this specification when I use the phrase bituminous substance, I wish it to be understood that I am including not only those substances which are now classified as bitumen whether native or artificial, but also substances which exhibit similar characteristics. For example, I am referring not only to the residual pitches which are the products of the distillation of petroleum, but I am also referring to the coal tar pitches and like plastic organic substances.

I will illustrate my invention with reference to its application to the improvement of residual pitches, such as are commonly used in the paving arts, (but this will be understood as being an illustration, rather than a restriction of my invention), and more particularly with relation to its application to the paving arts.

Substances which form apparently homogeneous solutions in liquids and which are not removed therefrom by ordinary filters, but which will not diffuse through a membrane, and observation of which under the ultra-microscope shows to be dispersed in solid form, are known as "disperse colloids", or the disperse phase of matter in a colloidal state; the other component of the system is commonly spoken of as the continuous phase.

According to my process I incorporate with a bituminous substance a proper proportion of a substance in the state of a disperse colloid, as for example, a fine clay. The intimate and uniform dispersion of clay in a colloidal state throughout the bituminous substances cannot be very well accomplished by merely adding the clay to the bitumen, but I have discovered that by first combining the clay with a proper amount of water in the form of an aqueous paste and then adding this paste to the bituminous substance, agitating the combination and subsequently evaporating the water, I accomplish the required intimate dispersion of the clay in its colloidal state throughout the bituminous substance, to secure the benefits of my invention. Accordingly the clay which is to be dispersed in relation to the bitumen, must be of a sufficient degree of fineness to be capable of existing in a colloidal condition in relation to water, as well as in relation to bitumen.

In practice I prepare an aqueous paste by the addition of water to a clay capable of furnishing the desired amount of such a disperse colloid. With highly colloidal clays, I have used three parts of water to one of clay. With poorer clays more water may be employed. This paste is added to a bituminous substance in proportions varying with the character of the substance and the object for which the material is to be used. The amount of disperse colloid should be at least one or two per cent., but may be increased to any percentage at which the bitumen will melt and flow. But it will be understood that if the proportion of clay is too large, the bitumen is incapable of constituting a continuous phase in relation to the clay, and accordingly instead of matter in a colloidal state, there results a mere mixture which does not constitute my invention. Proper agitation of the paste and the bitumen with steam or air will effect uniform emulsification of the two components. The water with which the disperse colloid has been associated is then removed as by evaporation.

As an example of the advantageous practice of my invention in connection with the paving industry, I may add to any crude petroleum, maltha or liquid residuum from the distillation thereof, or to any form of bitumen sufficiently liquid below the temperature of boiling water, to make an emulsion with the clay paste, from twenty to fifty per cent. of a liquid paste consisting of water and clay containing disperse colloidal matter, varying in amount according to the quality of the clay, but, of course, the more desirable the larger percentage of this material although the coarser portion may be looked upon as desirable as an ordinary filler, although undesirable if it is sufficiently coarse to settle out during distillation and thus form a cake or coke upon the walls of the still. This combination is emulsified by passing through it steam or air or by other means of agitation, and evaporating the water, incidentally in some cases distilling off some or all of the more volatile portions of the bitumen, according to the uses to which the resulting residual pitch is to be put in the preparation of asphaltic cements for paving mixtures.

By accomplishing the addition of the disperse colloid to the bituminous substance, in the form of aqueous paste, I am able to secure its dispersion throughout and intimate association with the bituminous substance in a thoroughly uniform manner with the production of a substance in a truly colloidal form, of which the bitumen constitutes the continuous phase. No such result or product has been secured where attempts have heretofore been made to add finely divided mineral matter directly to a bituminous substance in the attempt to thereby secure increased stability of the product. Nor have such results been attained where attempts have been made to add tar to clay, in such proportions that the mixed ingredients are incapable of assuming colloidal relations to each other. I believe my improved result to be due to the uniform dispersion secured by adding to the bitumen the finely divided matter in the state of a disperse colloid already intimately combined with water. This accomplishes a similar dispersion of the substance throughout the bitumen, notwithstanding the subsequent removal of the water.

Having thus described my invention, I claim:

The process of increasing the stability of bituminous substances, which consists in preparing an aqueous paste of clay of such fineness as to be capable of colloidal dispersion with relation to the water, combining such paste intimately and uniformly with a sufficient quantity of the bituminous substance for the latter to form a continuous phase and accomplish the colloidal dispersion of the clay with relation to the bitumen, and removing the water.

In testimony whereof, I have hereunto signed my name at Philadelphia, Pennsylvania, this eighteenth day of August, 1914.

CLIFFORD RICHARDSON.

Witnesses:
JAMES H. BELL,
E. L. FULLERTON.